Feb. 7, 1950
E. L. SCHWARZ-KAST
2,496,919
FOOD MIXER
Filed June 14, 1946
2 Sheets-Sheet 1
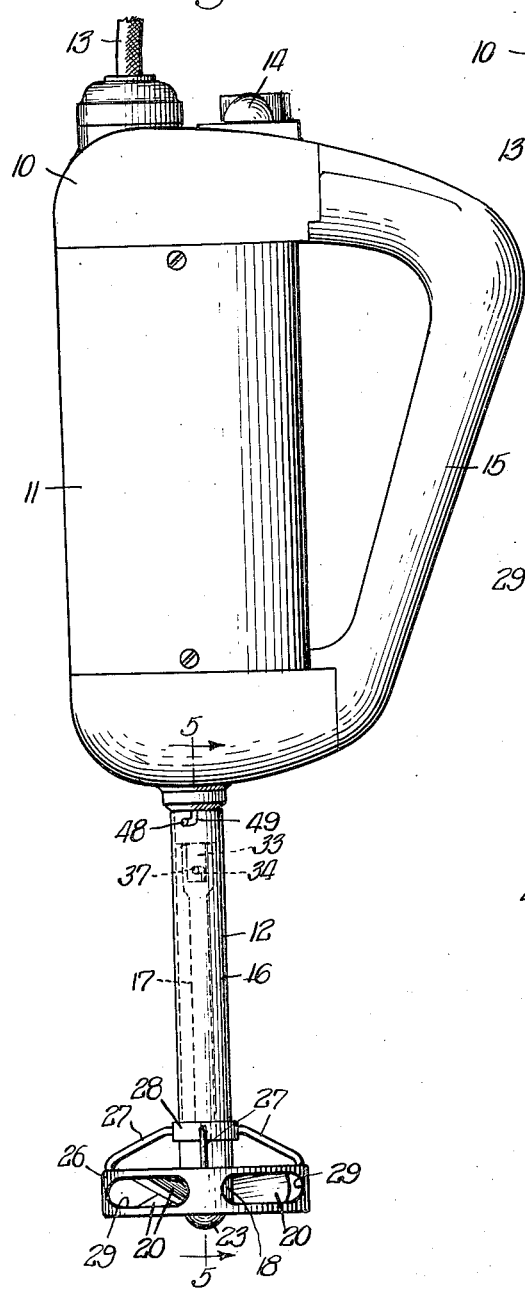
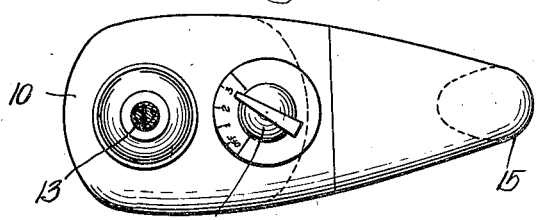
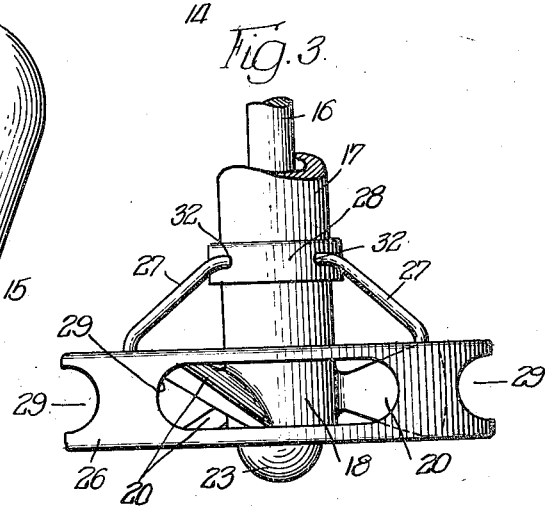
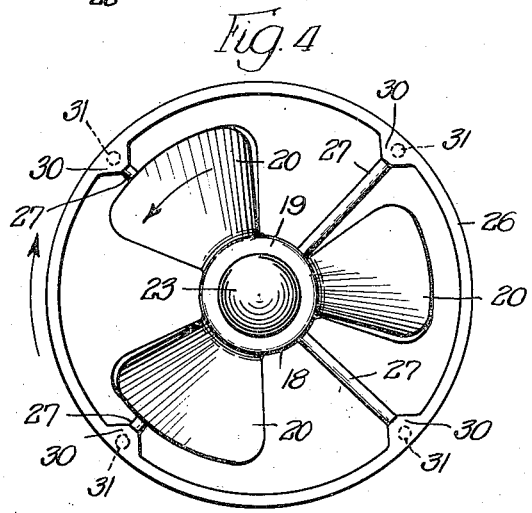
INVENTOR.
Ernst L. Schwarz-Kast,
BY
Cromwell, Greist & Warden
Attys.

Feb. 7, 1950 — E. L. SCHWARZ-KAST — 2,496,919
FOOD MIXER
Filed June 14, 1946 — 2 Sheets-Sheet 2
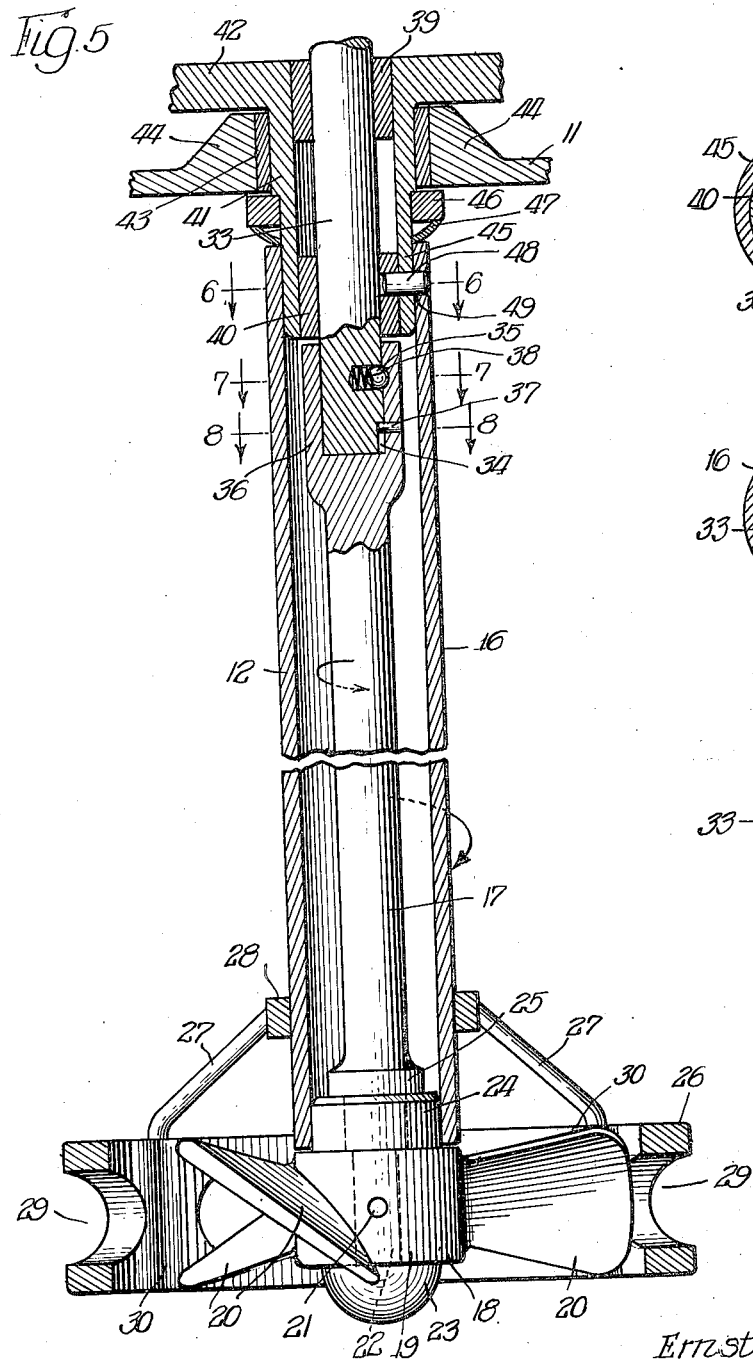
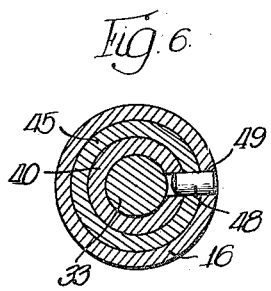
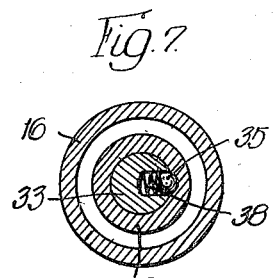
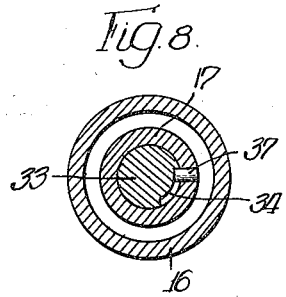
INVENTOR.
Ernst L. Schwarz-Kast,
BY
Cromwell, Greist & Warden
attys Patented Feb. 7, 1950

2,496,919

UNITED STATES PATENT OFFICE 2,496,919

FOOD MIXER

Ernst L. Schwarz-Kast, Chicago, Ill., assignor to Franklin Appliance Company, a corporation of Illinois Application June 14, 1946, Serial No. 676,655

3 Claims. (Cl. 259—132)

My invention relates generally to apparatus for mixing materials and is particularly concerned with improvements in the construction of domestic food mixers.

It is an object of my invention to provide a food mixer having a beater construction which will thoroughly and quickly mix fluids of varying viscosities or fluids and solids of varying densities and physical properties; which will readily break up solid lumps in the material being mixed; which does not raise the level of the material in the mixing vessel excessively; which will satisfactorily mix a large amount or a relatively small amount of material in the mixing vessel; and which is splatter-proof in operation.

A further object of my invention is to provide in a food mixer a beater construction comprising oppositely rotating concentrically arranged beater elements, the action of which is to thoroughly mix or agitate all the material in the mixing container while pulling the material being mixed away from the walls of the mixing container and toward the middle of the mixing area at a relatively low level whereby the material is prevented from crawling up the side of the mixing container to any substantial distance above the normal level of the material.

A further and more specific object of my invention is to provide oppositely rotating concentrically arranged beater elements comprising an apertured outer member and an inner propeller-like member whereby the material to be mixed is drawn downwardly between the concentric members and projected outwardly from the bottom and through the apertures in the outer member to break up solid lumps in the material and to thoroughly and quickly mix the material in a highly satisfactory manner.

Another object of my invention is to provide a beater construction comprising oppositely rotatable beater elements mounted on separable concentric shaft members and mechanism for detachably connecting the shaft members to driving mechanism operated by the mixer motor.

These and other objects will be apparent from the description of the preferred form of my invention which is shown by way of illustration in the accompanying drawings, wherein:

Fig. 1 is an elevation of a food mixer incorporating my improved beater construction;

Fig. 2 is a top view of the device shown in Fig. 1;

Fig. 3 is a detail of the beater members, drawn to an enlarged scale;

Fig. 4 is a bottom view of the beater members shown in Fig. 3;

Fig. 5 is a partial longitudinal section of the beater construction and the portions of the driving mechanism to which it is attached, drawn to an enlarged scale;

Fig. 6 is a section on the line 6—6 of Fig. 5;

Fig. 7 is a section on the line 7—7 of Fig. 5; and

Fig. 8 is a section on the line 8—8 of Fig. 5.

As illustrated in Figs. 1 and 2, the preferred form of my food mixer 10 comprises a body portion or housing 11, in which a conventional driving motor is enclosed, and my improved beater construction 12. A means for supplying current to the motor is indicated at 13 and a combined switch and speed control mechanism at 14. The body portion 11 is provided with a handle 15 which is grasped by the operator when using the mixer. The mixer 10 is portable and may be used to mix various kinds of materials in any conventional mixing receptacle or container.

The beater construction 12 comprises an outer tubular shaft 16 and an inner shaft 17. Both shafts 16 and 17 are detachably connected to the drive shaft of the mixer motor by mechanism which will be described, so that the shafts, when driven by the mixer motor, will rotate in opposite directions, as indicated by the arrows in Fig. 5.

The inner shaft 17 is provided at its lower or free end with a propeller-like beater member 18. The member 18 comprises a hub 19 provided with three symmetrically shaped impeller blades or paddles 20 which are arranged equidistantly around the hub. The preferred pitch of the blades 20, as illustrated, is approximately 45° to the plane of rotation, inwardly of the length of the shaft 17, and in the direction of rotation of the same. The hub 19 is permanently and rigidly secured by a pin 21 to a reduced portion 22 at the end of the shaft 17. The hub 19 is provided with an integral dome-like end member 23 which is adapted to rest on the bottom of the mixing container and space the rotatable members from the bottom wall of the same. A collar 24 is provided on the shaft 17 between the hub 19 and a peripheral abutment shoulder 25 thereon. The collar 24 has a diameter sufficient to provide a relatively close fit between the collar and the inside of the tubular shaft 16.

The outer tubular shaft 16 is provided with a tubular section or ring-like beater member 26 which surrounds the beater member 18 in concentric relation. The beater member 26 is supported on the shaft 16 by means of wire-like arms 27 and a collar 28 which is rigidly secured on the shaft 16. The beater member 26 is provided with peripherally spaced elongated holes or slots 29 and spaced, inwardly directed, rib-like projections 30 on the inner surface between the holes 29. The relative thickness of the ring member 26 and the projecting ribs 30, and the spacing between these members and the blade carrying member 18, is such that there is substantial clearance between the inner wall of the member 26 and the ends of blades 20 and somewhat less clearance between the projecting rib members 30 and the ends of blades 20. The supporting arms 27 are attached to the ring member 26 by means of apertures 31 located adjacent the ends of the ribs 30, as shown, for added strength. The other end of each arm 27 is rigidly secured at 32 to the collar 28 in a similar manner. Any other means of supporting ring member 26 on the end of shaft 16 which permits relatively free movement of the material between the mixing members 18 and 26 may be resorted to.

The inner beater shaft 17 is detachably connected to the end of a shaft 33 which is driven by the mixer motor. The end of shaft 33 (Fig. 5) is provided with a bayonet slot 34 and a spring-pressed ball latch member 35. The end of shaft 17 is enlarged and provided with an axial socket 36. An inwardly extending pin 37 is provided in the socket 36 for cooperation with the slot 34 on the shaft 33. A detent 38 is also provided in the socket 36 for indexing and latching cooperation with the latch member 35 on the shaft 33.

The end of shaft 33 is rotatably supported in spaced bearing members 39 and 40 which are secured in the hub 41 of a driving gear 42 which is in turn rotatably supported in a bearing member 43 secured in the end wall 44 of the mixer housing 11. The hub 41 has a reduced portion 45 extending beyond the housing wall 44 which is provided with a locking collar 46 and a spring washer 47. The hub portion 45 is provided with a driving pin 48. The beater shaft 16 is provided with a bayonet slot 49 for cooperation with the driving pin 48 on the hub portion 45. The spring washer 47 functions to retain pin 48 and slot 49 in driving relation while permitting sufficient axial movement of the shaft 16 to enable it to be manually disconnected from the hub portion 45. The gear 42 is connected by appropriate driving mechanism to the mixer motor so that the gear 42 and the shaft 33 are rotated in opposite directions. The preferred speed of operation for the inner shaft is 920 to 1400 R. P. M. and for the outer shaft is 650 to 980 R. P. M. Efficient operation of the beater members is obtained when they are operated at approximately the same peripheral speed.

When the mixer is used for mixing a material the operator grasps the handle 15 and lowers the beater members 18 and 26 into the material in the mixing container. If there is a sufficient depth of material in the mixing container to completely immerse the beater members 18 and 26, the oppositely rotating beater members will draw the material downwardly between the members and then project it downwardly and outwardly of the same to thoroughly agitate the material without raising the level of the material in the container excessively. If there is only a relatively small amount of material in the container and the beater members 18 and 26 are only partially immersed, the beater members will draw the material inwardly through the apertures 29 in the ring member 26 and project it downwardly between the members to effectively agitate and mix the same in a highly satisfactory manner. The material being mixed does not crawl up the sides of the container appreciably but is drawn away from the walls toward the beater members at a relatively low level. Regardless of the depth of the material being mixed, the beater members perform the mixing operation in an efficient manner without any splattering of the material.

The detachable connections provided between the beater shafts 16 and 17 and the driving members of the mixer permit rapid and easy assembly and disassembly of the mechanism while the shafts 16 and 17, being separable from each other, are readily cleaned and repairs, when required, may be quickly and easily made.

The mixer, which is illustrated, is designed for driving a single beater attachment. It is contemplated that my beater construction may be used with a mixer having provisions for driving two or more of the beater arrangements, each of which may be rotated in any desired manner relative to the others.

While the new mixer is illustrated herein as of the type which is adapted to be held in one's hand, it is equally suited for association with a stand or other support, in a vertical position or in any other desired position. Although the construction is designed particularly for food mixers, it is sutable for devices which are intended for use in mixing other materials.

While specific details of construction and operation are referred to, it will be understood that other modes of construction and operation may be resorted to within the spirit of my invention.

I claim:

1. A beater construction for use with a food mixer, comprising concentrically arranged rotatable shaft members adapted to be driven in opposite directions, a relatively narrow ring-like beater element secured to the end of the outer one of said rotatable shaft members, and a propeller-like beater element secured to the inner one of said rotatable members in concentric relation to said ring-like beater element, said ring-like beater element having elongate apertures spaced circumferentially of its outer periphery and inwardly directed vertical ribs on its inner surface in the spaces between said apertures whereby material being mixed is drawn down between said beater elements and projected downwardly and outwardly therefrom.

2. In a beater construction for a food mixer or the like, having concentrically mounted oppositely rotatable shafts, a multiple blade propeller-like agitator member secured on the end of the one shaft, a relative narrow ring-like agitator member secured on the end of the other shaft, said ring-like member surrounding said propeller blades with the inner surface thereof in close proximity to the outer edges of said blades, said agitator members being arranged to rotate in substantially the same plane and said ring-like member being provided with circumferentially spaced elongated slots in the outer surface thereof cooperating with said propeller blades to agitate the material acted upon.

3. A beater for a food mixer or the like, comprising a rotatable inner shaft and a concentrically arranged tubular outer shaft adapted to be rotated in an opposite direction, peripherally spaced radially extending impeller blades rigidly attached to the end of said inner shaft, said impeller blades being warped inwardly of the length of the shaft at an angle of approximately 45° to the plane of rotation and in the direction of rotation to effect the outward impelling of the material acted upon, a relatively narrow ring member in encompassing relation to said blades, said ring member circumferentially spaced slots in its peripheral surface, and radially inwardly extending ridge-like vertical members arranged on the inner surfaces of said ring member between said slots, and having their inner extremities in close proximity to the ends of said blades.

ERNST L. SCHWARZ-KAST.

REFERENCES CITED

The following references are of record in the file of this patent:

UNITED STATES PATENTS

| Number | Name | Date |
|---|---|---|
| 44,015 | Ransom | Aug. 30, 1864 |
| 874,292 | Blackford | Dec. 17, 1907 |
| 943,735 | Collins | Dec. 27, 1909 |
| 1,032,663 | Fay | July 16, 1912 |
| 1,070,728 | Preston | Aug. 19, 1913 |
| 1,247,655 | Frame | Nov. 27, 1917 |
| 1,255,944 | Stevens | Feb. 12, 1918 |
| 1,763,301 | Gilbert | June 10, 1930 |

FOREIGN PATENTS

| Number | Country | Date |
|---|---|---|
| 476,791 | Great Britain | Dec. 15, 1937 |

Certificate of Correction

February 7, 1950

Patent No. 2,496,919     ERNST L. SCHWARZ-KAST

It is hereby certified that errors appear in the printed specification of the above numbered patent requiring correction as follows:

Column 5, line 5, after the syllable "ber" and before "in" insert the words *rigidly secured to the end of said tubular shaft*; line 6, before "circumferentially" insert *having*; and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*